(12) United States Patent
Tracy et al.

(10) Patent No.: US 6,595,258 B2
(45) Date of Patent: *Jul. 22, 2003

(54) DISK LABELING DEVICE

(75) Inventors: Peter H. Tracy, Boca Raton, FL (US); Selwyn Pires, Middlesex (GB)

(73) Assignee: Fellowes, Inc., Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/167,210

(22) Filed: Jun. 11, 2002

(65) Prior Publication Data

US 2002/0148568 A1 Oct. 17, 2002

Related U.S. Application Data

(63) Continuation of application No. 09/247,437, filed on Feb. 10, 1999, now Pat. No. 6,431,237, which is a continuation-in-part of application No. 09/141,848, filed on Aug. 27, 1998, and a continuation-in-part of application No. 08/685,555, filed on Jul. 24, 1996, now Pat. No. 6,321,814.

(51) Int. Cl.[7] .............................. B65C 1/00; B65C 1/02; B65C 9/26
(52) U.S. Cl. ....................... 156/391; 156/556; 156/580; 156/DIG. 1; 156/DIG. 2
(58) Field of Search ............................... 156/391, 556, 156/580, DIG. 1, DIG. 2, DIG. 3, 582

(56) References Cited

U.S. PATENT DOCUMENTS

| 3,687,769 A | 8/1972 | Dague |
| 4,213,927 A | 7/1980 | Alberti |
| 4,385,460 A | 5/1983 | Hanna |

(List continued on next page.)

FOREIGN PATENT DOCUMENTS

| AU | 670909 | 8/1996 | | |
| DE | 29610120 U1 | * 11/1996 | ............. | B65C/1/02 |
| EP | 0 102 250 | 3/1984 | | |
| EP | 0 422 774 | 4/1991 | | |
| EP | 0 514 156 | 11/1992 | | |
| FR | 2763913 A1 | * 12/1998 | ............. | B65C/9/26 |
| GB | 2 290 526 | 1/1986 | | |
| GB | 2 203 278 | 10/1988 | | |
| GB | 2 209 863 | 5/1989 | | |
| GB | 2305907 | 4/1997 | | |
| WO | WO 96/05057 | 2/1996 | | |

Primary Examiner—Richard Crispino
Assistant Examiner—Sue A. Purvis
(74) Attorney, Agent, or Firm—Brinks Hofer Gilson & Lione

(57) ABSTRACT

A device for the positioning of a label, having a central aperture and peripheral edge, onto a surface of a disk, having a central hole and an outer edge including three components: (1) a support base for the label having a central aperture; (2) a centering spindle having a first and second, reduced diameter portions for relatively centering the label and disk, the disk being seated on a shoulder between the first and second diameter portions; and (3) a compressible foam pad, cylindrical in shape adapted to be adhered to the bottom of the second diameter portion of the spindle and positioned in an aperture in the base on which the spindle may be seated. With the disk retained on the shoulder and centered by the second diameter portion of the spindle passing therethrough, the disk is moved towards the label supported adhesive side up on the base. The first diameter portion of the spindle enters the aperture in the base, centering the label relative to the disk and compressing the foam pad, which exerts a counterforce, uniformly between the disk and label as the two are adhered and united, to uniformly adhere the label to the disk without wrinkles or air pockets. The spindle and pad can be formed as an integral unit to reduce the components to two by the addition of a stabilizing plate ultrasonically welded to the pad at one end, and at its other end, the pad can be ultrasonically welded to the spindle.

12 Claims, 6 Drawing Sheets

U.S. PATENT DOCUMENTS

| | | |
|---|---|---|
| 4,542,426 A | 9/1985 | Wilkinson, Jr. et al. |
| 4,653,666 A | 3/1987 | Mertens |
| 4,687,536 A | 8/1987 | Hiramatsu et al. |
| 4,903,255 A | 2/1990 | Sugaya et al. |
| 5,001,700 A | 3/1991 | Rowden et al. |
| 5,084,127 A | 1/1992 | Nakamura |
| 5,316,464 A | 5/1994 | Lexell |
| 5,346,654 A | 9/1994 | Kodaka et al. |
| 5,421,950 A | 6/1995 | Parrish |
| 5,783,033 A | 7/1998 | Grossman |
| 5,951,819 A | 9/1999 | Hummell et al. |
| 5,958,177 A | 9/1999 | Claussnitzer |
| 6,240,990 B1 * | 6/2001 | Claussnitzer ................ 156/391 |

\* cited by examiner

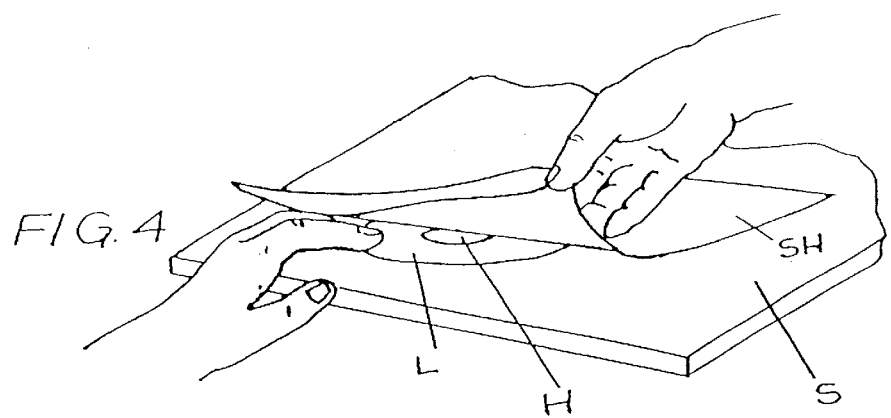
FIG. 4
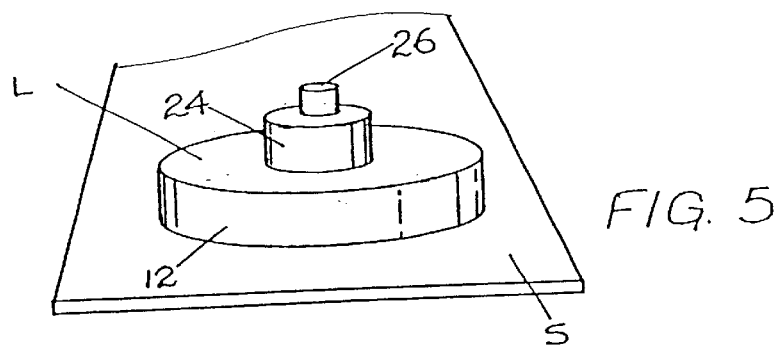
FIG. 5
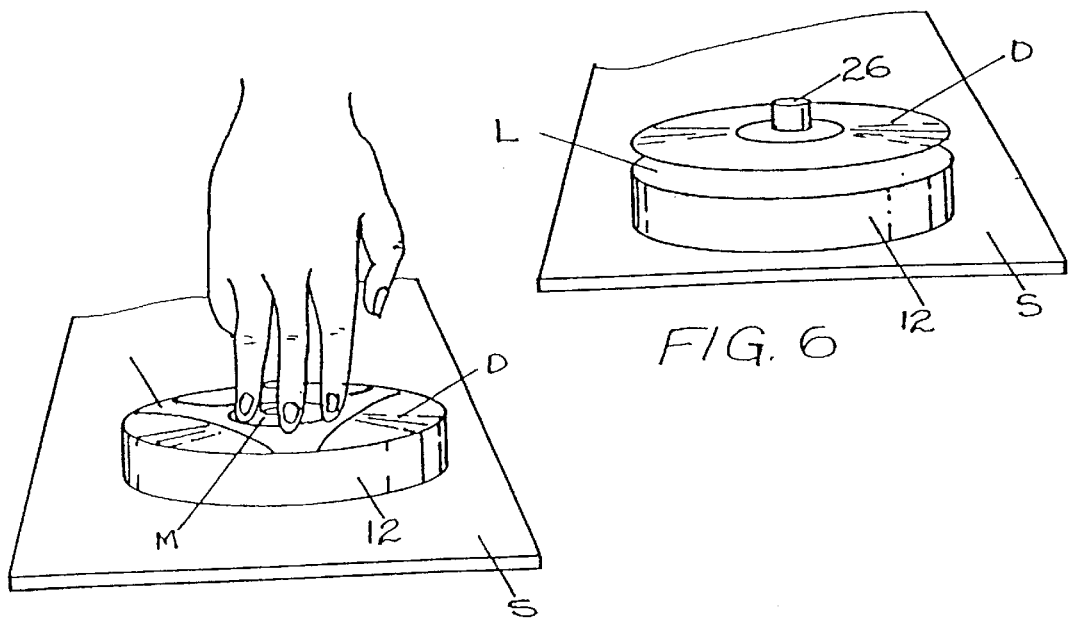
FIG. 6
FIG. 7

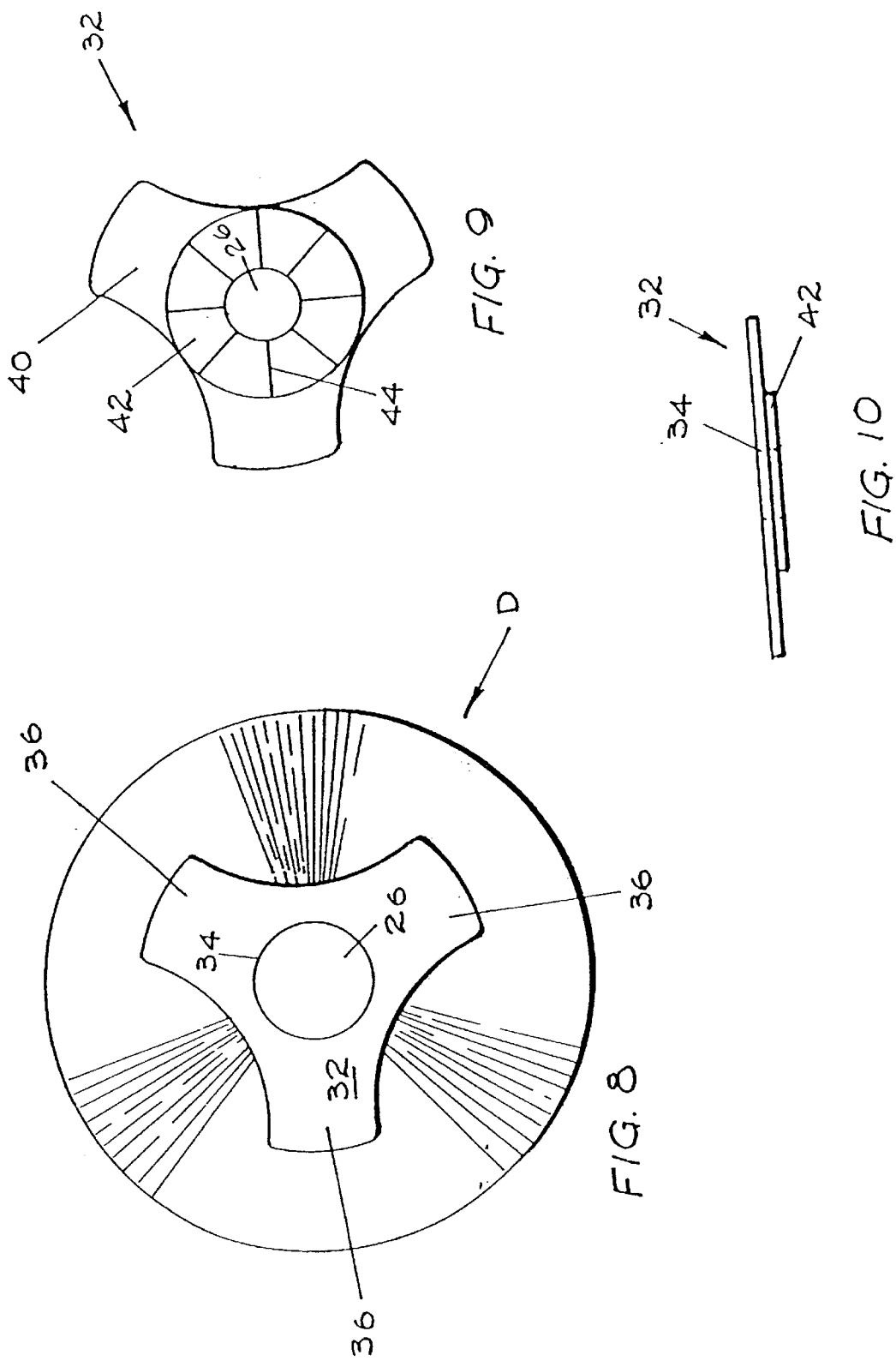

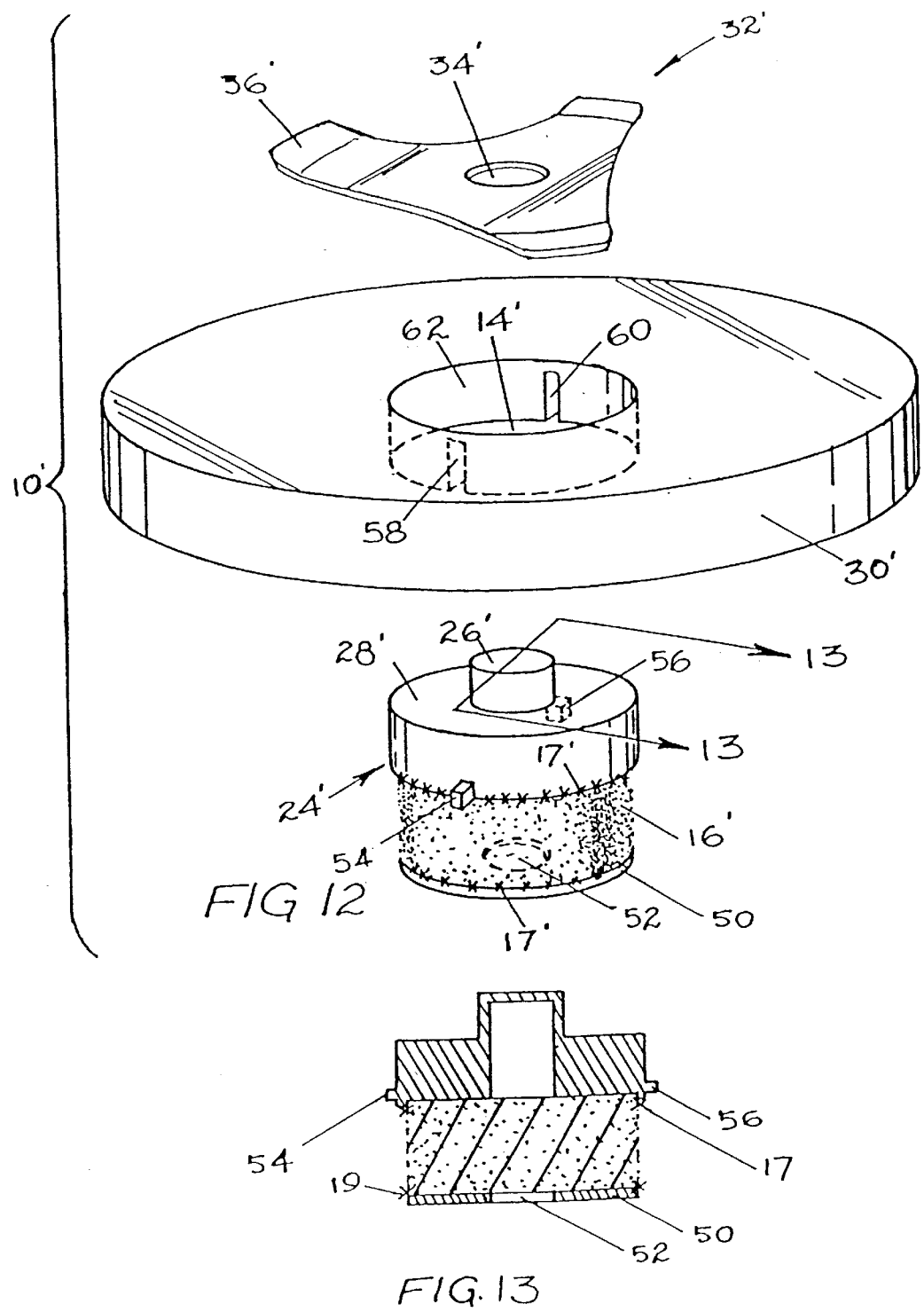

DISK LABELING DEVICE

CROSS REFERENCE TO RELATED APPLICATIONS

The present application is a continuation of U.S. application Ser. No. 09/247,437, filed Feb. 10, 1999, now U.S. Pat. No. 6,431,237, which in turn is a continuation-in-part of U.S. application Ser. No. 09/141,848, filed Aug. 27, 1998, and U.S. Ser. No. 08/685,555, filed Jul. 24, 1996, issued as U.S. Pat. No. 6,321,814 on Nov. 27, 2001, all of which are incorporated herein by reference in their entirety.

FIELD OF THE INVENTION

The present invention -relates to the field of compact disk labeling devices, and more particularly to a device for centering a disk with respect to a self-adhesive label while maintaining them in spaced relation and subsequently allowing them to contact, formatting a labeled disk.

BACKGROUND OF THE INVENTION

The proliferation of compact disks (discs), also known as laser disks, in the form of music as well as CD-ROM products has become extensive. In recent years, recordable compact disks such as those produced by SONY, 3M, and KODAK has grown in popularity. Further, these disks are being used for archival data storage, immediate distribution of data, and for demonstration purposes. With this recent use has grown a need to label these disks once they have been produced. This is because once produced, there is no generally available visual method for determining the contents of the disk, without reducing storage capacity below the 680 MB of data of more, without external markings.

While manufacturers of large numbers of identical disks have their labels or identifying information painted, silk-screened or printed onto the disks, e.g., a layer of adherent ink adherent ink or pigment is applied to the surface of the disk, this method is generally impractical for recordable compact disk producers. For small runs or those requiring immediate availability of the disk, printing or painting based methods of labeling take too much time, incur a significant setup charge, and require special equipment. Automated disk imprinting devices may be large and cumbersome, with bulk pigmented ink supplies generally favoring long production runs.

Another known method of labeling a compact disk employs a direct printing using an ink jet system onto the surface of a disk. These systems provide a special carrier for the disk, which is printed using a conventional ink jet printing apparatus. This method suffers the shortcomings of ink jet technology, including problems with the inks used, such as smudging, running, lack of scratch resistance on the disk surface, and the like. This ink jet printing technology is also relatively slow.

Ink markers may also be used to label disks, but this is unattractive and can cause damage to the disk by breaking down the coating which protects the disk. Permanent ink markers often include solvents in the ink. As a result, manufacturers such as Avery Dennison, Avery Division, Diamond Bar Calif., produce self-adhesive labels shaped like, and designed for compact disks. Improper placement of a label on a disk, especially with the advent of high speed, e.g., ten or higher speed data transfer (with single speed data transfer defined as the rate necessary to support CD audio), and higher information density disk recording technologies, such as Digital Video Disk ("DVD"), may result in read errors, or drive motor damage due to dynamic imbalance of the disk.

Other known prior art includes: Kodaka et al, U.S. Pat. No. 5,346,654, which relates to a method for forming indicia on compact disks. This method employs a molded impression from a "mother", and does not apply an adhesive label. Lexel, U.S. Pat. No. 5,316,464, relates to a hinged structure for pressing a marking onto a compact disk, and also does not apply an adhesive label. Sugaya et al, U.S. Pat. No. 4,903,255, on the other hand, relates to an adhesive label marking system for compact disks. However, the labels are ultimately applied manually, without any apparatus for assisting in accurate placement on the disk. Hanna, U.S. Pat. No. 4,385,460, relates to an optical disk or phonorecord label having a hinged portion for individualized marking, which is apparently manually applied. Nakamura, U.S. Pat. No. 5,084,127, relates to a labeling system for 3.5 inch magnetic media encased in a rectangular plastic enclosure, and thus, whsle placing the labels in a desired location, do not place the label concentrically directly on the rotating media.

In U.S. Pat. No. 5,543,001, and U.S. Ser. No. 661,443, filed Jun. 11, 1996, both assigned to the same assignee as the present invention, a compact disk labeling device and method is disclosed which provides various embodiments intended to assist in the accurate placement of an adhesive label, generally bearing a pressure sensitive adhesive, to a surface of a disk.

In a preferred embodiment, the label is centered with respect to the disk by means of a tapered member, inserted through the central aperture of the label, which gradually centers the label until it is in defined position. The disk is centered by a dowel inserted all the way through the spindle hole. After the label and disk are centered, a force is applied, allowing adhesion of the label to the disk. The force may be applied, for example, by a base on which the label rests, adhesive surface upward. The base, in this case, has an aperture allowing the tapered member to pass through. The dowel extends upwardly from the tapered member, and thus may serve as a handle. The label is placed on the surface of the base, adhesive side upward, with the central aperture overlapping the aperture in the base. The disk is placed on the dowel, and rests against a shoulder at an upper portion of the tapered member, with the side to be labeled facing downward. The tip of the tapered member is pressed through the central aperture of the label and the aperture of the base, with the tapered portion exerting a lateral force to center the label with respect to the tapered member.

After the label is centered, the disk, resting on the shoulder is further lowered, until it contacts the label. A force is uniformly applied which permits complete and uniform adhesion throughout the contact area between the disk and label, as compared to the device and apparatus of Japanese patent JPA 532498, where the adhesion force may cant the disk for an uneven application of the label among other deficiencies, i.e., the use of two positioning members being mandatory. The label normally has a contact adhesive, which requires a relatively low contact force to cause a strong adhesion, and thus a uniformly applied force will cause complete adhesion.

The label thus generally has a central circular hole, larger than the central aperture in the disk, so that no clearance problem will arise. A member within this central circular hole, which has a largest dimension approximately equal to the diameter of the hole, will locate the center of the label. This member is preferably a tapered tip cylinder, which provides an initial taper so that the tip may be easily guided into the central hole. Further insertion will gently relocate the label with respect to the member, until the label is concentric around the cylindrical portion of the member.

The label is centered by the taper on the tapered member and its larger diameter cylinder with respect to the disk. The larger diameter cylinder is insertable through the label and, in the preferred embodiment, the aperture in the surface. When the label is in a place near the junction between the larger and small diameter cylinders, the disk lies nearly adjacent to the label, properly positioned. Pressure may then be applied on top of the disk which is centered relative to the label by the dowel inserted all the way through the spindle hole so it cannot pivot or cant relative to the spindle axis, by any suitable means, including manual pressure, pressure on a pressure plate, an automatic pressure device, a spring or weight, or other known means, forcing intimate contact between the label and the disk, thus adhering the two.

The compact disk with the newly affixed label is then removed from the device by lining the cylindrical extension and pulling the positioning cone out of the positioning hole and the hollow core portion. Thereafter, the compact disk is lined off cylindrical extension. It not permanently affixed, the positioning plate may be removed from the cylindrical base and used to further press the label onto the compact disk. This last step is carried out by placing the positioning plate on top of the compact disk and manually pressing the plate against the disk whsle the disk is lying on a substantially flat surface. A separate pressure plate may also be provided, or another compact disk employed in order to compress the label.

Preferably, the label is held and pressed flatly against the disk to avoid wrinkles. Alternatively, after suitable alignment, the label may be "rolled" onto the disk, i.e., applied to the disk by applying pressure along a chord or radius of the disk extending across the label.

Further, in order to prevent finger prints from appearing on the data surface of the compact disk, it is preferred that the pressure be manually applied centrally to the compact disk, inside the data region, of that a separate device, e.g., a plate or "dummy" compact disk be provided to apply pressure to the disk without finger contact. Of course, a user may wear gloves to avoid direct finger contact.

Generally, contact adhesives applied to labels have a strong adhesion even when applied under light pressure; the reason for care in the application of pressure is to assure that the label does not shift or curl during application and to eliminate air bubbles under the label.

It has also been proposed that a member for axially aligning the disk and the member of axially aligning the label are affixed to one another. Since the disk spindle aperture is smaller than the label central aperture, a coaxial structure having varying characteristic radii may be provided, having a first member for aligning the disk and means for selectively contacting the label and the disk after alignment. For example, the contacting means may be a spring loaded cylinder with a central spindle mounted in a plate, as for example shown in U.K. patent 2305907A to Grossman, so that the label is supported by the plate and centered by the cylinder; the disk is supported by the cylinder and centered by the spindle, and after centering of each, the disk may be lowered to contact the label by compressing the spring, to ostensibly apply uniform pressure against the force of the spring.

The spring disclosed may be a helically wound resilient element. However, this requires a two part, inner and outer cylindrical member forming a housing for the spring and two relatively movable parts so the spring can be compressed, which is not only expensive, but subject to mechanical malfunction if the spring binds or rides on one of the elements. Assembly and maintenance of the assembly is also time consuming and the helically wound spring may apply an uneven pressure between the contacting surfaces of the disk and label causing air traps therebetween resulting it a wrinkled label.

Similar spring devices are also disclosed in German Patent 196 28 678, granted Oct. 29, 1998, and WP 98/10934, published Mar. 19, 1998.

Further, the prior art devices are generally not knock-down, except for the device previously disclosed in the assignee's prior patent and application, U.S. Pat. No. 5,543,001 and U.S. Ser. No. 661,443, but even so, cannot be conveniently packaged for shipment as a unit with minimum space requirements.

The present invention presents a solution to all these problems.

SUMMARY OF THE INVENTION

The present invention utilizes a compressible foam element as the counterspring force in lieu of a coiled spring between the disk and label to assure even distribution across the contacting surfaces. This results in simplifying the assembly of the device in use, and reduces the cost to a—minimum as only three components are necessary informing the device: (1) a support base for the label having a central aperture; (2) a centering spindle having a first and second, reduced diameter portions for relatively centering the label and disk, the disk being seated on a shoulder between the first and second diameter portions; and (3) a compressible foam pad, cylindrical in shape adapted to be adhered to the bottom of the second diameter portion of the spindle and positioned in an aperture in the base on which the spindle may be seated. With the disk retained on the shoulder and centered by the second diameter portion of the spindle passing therethrough, the disk is moved towards the label supported adhesive side up on the base. The first diameter portion of the spindle enters the aperture in the base, centering the label relative to the disk and compressing the foam pad, which exerts a counterforce, uniformly between the disk and label as the two are adhered and united.

The reduced diameter portion of the spindle may then be raised like a handle to remove the coupled disk and label from the base and the united pair removed from the spindle. The resilient foam pad resumes its uncompressed state, ready for reuse.

In another embodiment, the spindle and foam pad can be formed as an integral unit, reducing the labeling device to two main components, minimizing loss of the components and reducing shipping space.

These and other objects of the invention will become apparent from the following description and claims and from the accompanying drawings herein:

BRIEF DESCRIPTION OF THE DRAWINGS

FIG. 4 is a perspective view illustrating the removal of a label from its backing sheet;

FIG. 5 is a perspective view of the assembled labeling device supporting the label to be applied to a disk;

FIG. 6 is a perspective view of a disk positioned on the labeling device over the label to be adhered to the disk;

FIG. 7 is a perspective view illustrating the manner of adhering the label to the disk;

FIG. 8 is a top plan view of a washer positioned on the labeling device to preclude contact with the disk being labeled by the device;

FIG. 9 is a bottom plan view of the washer of FIG. 8;

FIG. 10 is a side view in elevation of the washer of FIG. 9;

FIG. 12 is an exploded perspective view of a second embodiment of the invention where the basic components of the disk labeling device minimized by forming the spindle, and sponge as one piece;

FIG. 13 is a cross-sectional view of the united spindle and sponge of the second embodiment of the invention taken substantially along the plane indicated by line 13—13 of FIG. 12;

DETAILED DESCRIPTION OF THE PREFERRED EMBODIMENT

Figure 1:
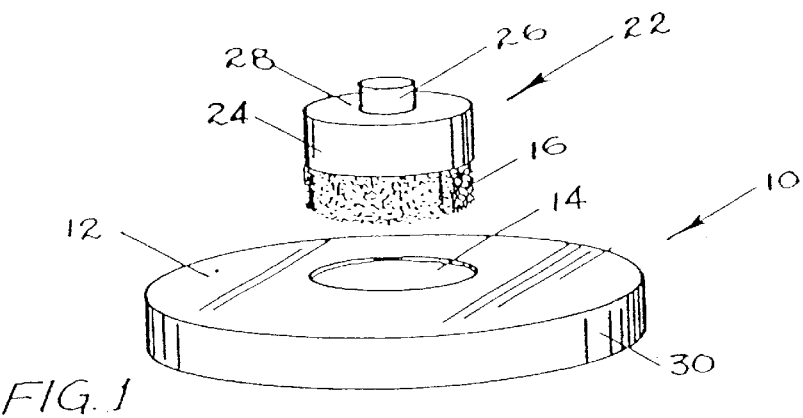
FIG. 1 is an exploded perspective view of a compact disk labeling device according to the present invention.

Referring now to the drawings in detail, wherein like numerals indicate like elements throughout the several views, the basic form of the labeling device of the invention is illustrated in FIG. 1 by the numeral 10.

Figure 2A:
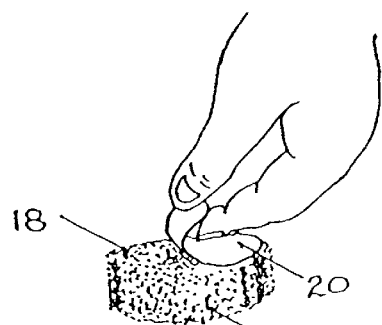
FIGS. 2A and 2B are exploded views illustrating the application of the compressible foam pad to the spindle.
Figure 2B:
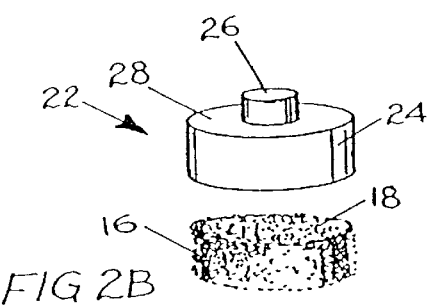

The labeling device 10 includes generally three basic elements: (1) a generally cylindrical base 12 having a centrally located cylindrical aperture 14; (2) a cylindrical, compressible foam pad 16 having an adhesive surface 18 which may be exposed by peeling a removable cover paper strip 20 provided with a suitable adhesive from the surface. (See FIG. 2A). The paper strip 20 may have an extension (not shown) for securing the foam pad to the packaging before assembly so as not to mislocate the pad; and (3) a centering spindle 22 having a first cylindrical portion 24 approximating the diameter of aperture 14 in base 12, and a second, reduced diameter portion 26 joined to the first cylindrical portion 24 by a cylindrical support shoulder 28. As illustrated in FIG. 2B, foam pad 16 has adhesive surface 18 adhered to the bottom of first cylindrical portion 24 of spindle 22.

Figure 3:
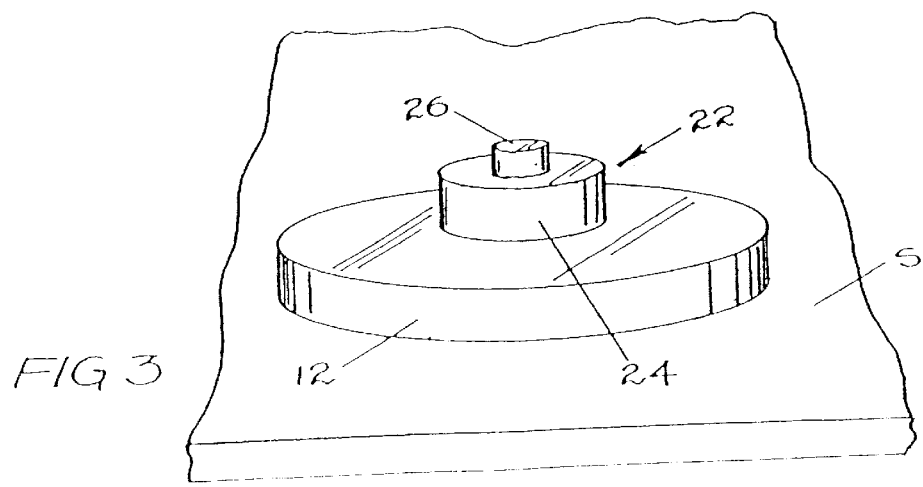
FIG. 3 is a perspective view of the assembled labeling device ready for use.
Figure 11:
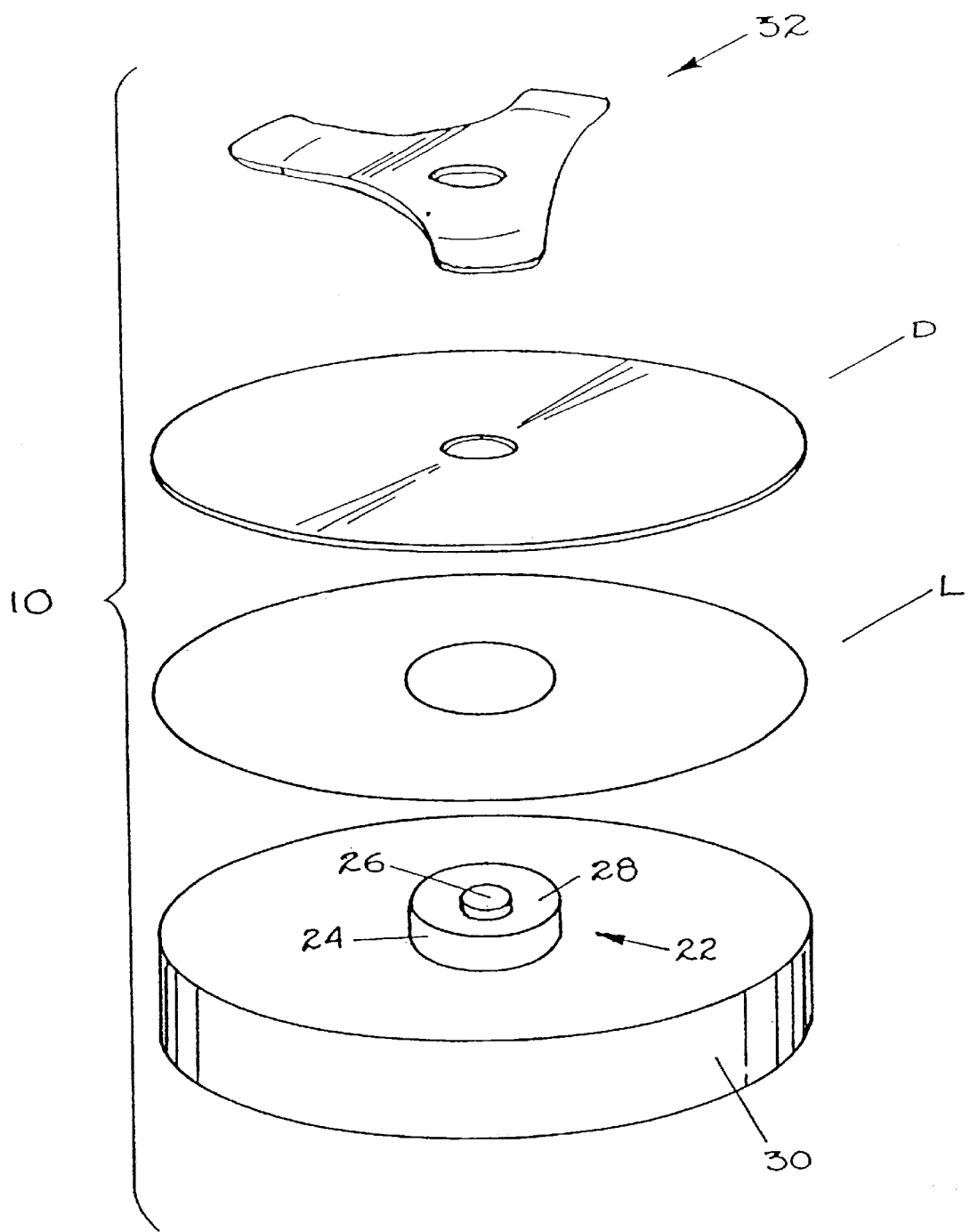
FIG. 11 is an exploded perspective view of the assembled components of the disk labeling device of FIGS. 1 to 10 in use position to adhere a disk to a label.
Figure 14:
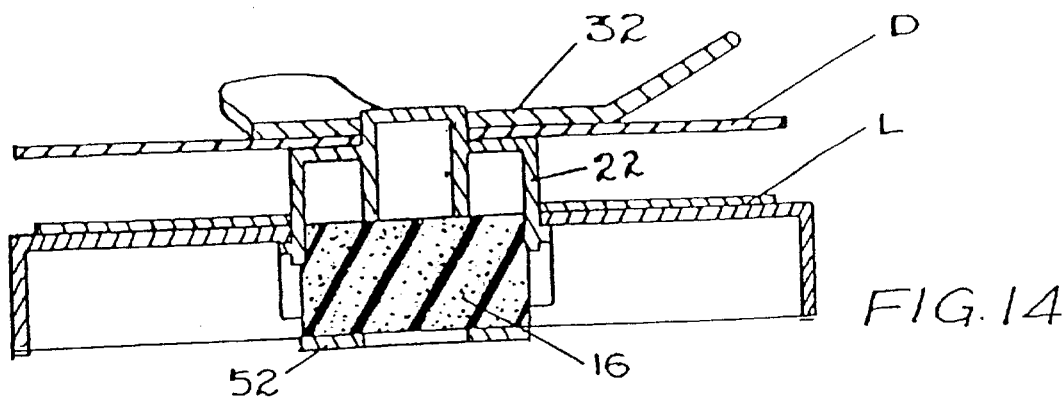
FIG. 14 is a longitudinal cross-sectional view of the united spindle and sponge of the second embodiment of the invention.
Figure 15:
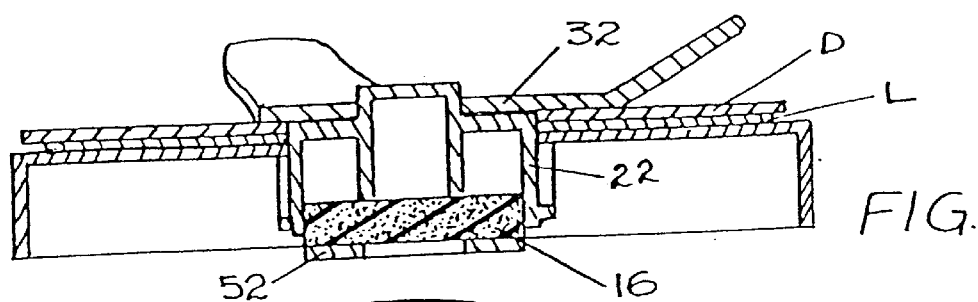
FIG. 15 a cross-sectional view similar to FIG. 14, but with the sponge depressed to bring the disk into contact with the label.
Figure 16:
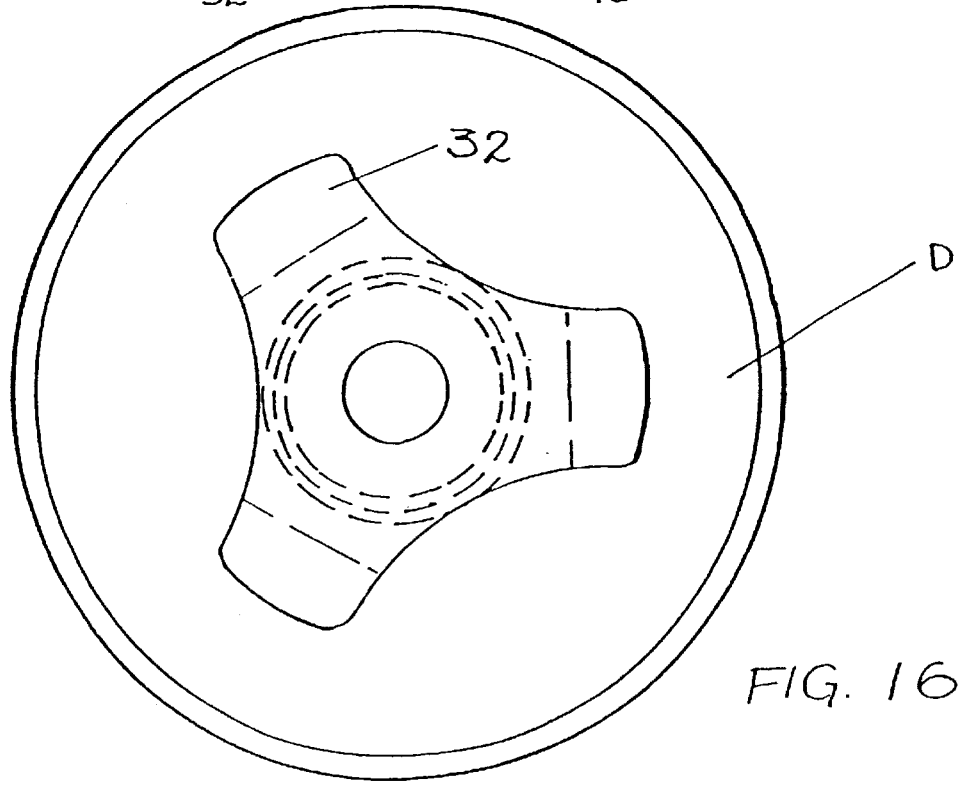
FIG. 16 is a top plan view of the labeler of FIG. 15.

As shown in FIG. 3, the labeler 10 is assembled by placing the base 12 on a fat surface S and inserting the foam covered end of the centering spindle 22 into the aperture 14 in the top of base 12 so that the foam pad 16 comes into contact with fat surface S.

A preprinted label sheet SH, printed side down, is placed on a flat surface S and a circular label L with a central hole H is peeled away from the sheet SH. Provided with a suitable adhesive, the label L is placed printed side down, adhesive or sticky side up on base 12 by sliding hole H, as shown in FIG. 5, over the larger, first diameter portion 24 of centering spindle 22, centering the label on base 12 relative to spindle 22 and reduced diameter portion 26.

A CD or DVD disk D can then be placed on the centering spindle 22 until it seats flush on shoulder 28 with the reduced diameter portion 26 projecting up through the center of disk D. The side of Disk D to be labeled—the non-data side of the disk—must be facing down.

Finally, the clear center part of disk D, or mandril M mounted on the reduced diameter portion 26 of spindle 22 and seated on shoulder 28 is pushed downwardly as shown in FIG. 7, applying pressure at three or four different points, until the disk D comes into contact with label L beneath it, compressing the foam pad 16 and adhering the disk and label; the reduced diameter portion 26 of spindle 22 maintains the disk D centered with respect to label L, and the disk D cannot cant or pivot relative to the label L because the portion 26 passes completely therethrough. The compressed foam pad 16 exerts a counterforce uniformly on the disk and label as the two are adhered and united. Upon relies of ginger pressure, the resilient foam pad returns to an uncompressed state, lining the united label and disk from base 12 and the reduced diameter portion 26 of the spindle 22 can serve as a handle to remove the coupled disk and label completely from the base, where they can be separated from the spindle 22.

While a resilient foam pad 16 is disclosed as the preferred embodiment for use with the labeler, it should be understood that a compressible and resilient pad made from other materials could also be used, such as rubber or a synthetic rubber neoprene pad, as long as the material is compressible and resilient. The pad may or may not be secured to the bottom of the spindle portion 24 or may be adhered to both the spindle portion 224 and its supporting surfaces.

The positioning plate 12 may also be enhanced by the placing of a felt, non-scratching surface in seated engagement therewith to preclude the written side of disk D from being damaged during securement of the label. The positioning plate 12 is provided with a cylindrical skirt 30 which may terminate in a solid plate or base for firmer support on a planar surface. While the thickness of the plate 12 surrounding the positioning hole 14 should be sufficient to prevent lateral dining of the spindle portion 24 and serve as a housing, a tube (not shown) may extend downwardly in coaxial alignment from positioning hole 14, approximately the diameter of pad 16 and of spindle portion 24 to house the same and present lateral movement. Finally, the surface of positioning plate 12, supporting the label L, may be slightly convex from the hole 14 to the outer circumference so that contact between the disk and label is first made in the center of the label and adhesion progresses therefrom along a chord or a radius of the label and disk to prevent air bubbles or wrinkles beneath the label.

Referring specifically to FIGS. 8 to 10, a washer 32 having a central opening 34 may be placed about spindle portion 26 and seated on disk TD prior to adhering the disk to the label L. Washer 32 may be provided with radial arms 36 for ranger contact in pressing the disk D into contact with the label L. The washer 32 is provided to preclude contact with the disk itself during the adhesion step and scratching or damage to the disk surface.

For a similar reason the bottom surface of washer 32 includes a thin, smaller, hollow disk 42 attached thereto, provided with interior radial arms 42 to raise washer 32 above the surface of the disk D to preclude damage to the surface when pressure is applied.

A second embodiment of the invention is illustrated in FIGS. 12 to 16, wherein primed numerals indicate like elements to those described in FIGS. 1 to 11.

In the second embodiment, the spindle 24' and compressible foam pad 16' are ultrasonically welded along their mating edges, 23' and 17', so that they are formed as an integral, one-piece unit, reducing the labeling device to two main components, minimizing loss of the components and reducing shipping costs.

The distal edge 19' of the pad 16' may also be ultrasonically welded to a plate 50 of similar diameter along edge 19' and the edge of the plate to provide rigidity and stability to the pad 16'. A hole 52 is formed in the center of plate 50 to permit air in the compressible pad 16' to escape upon compression of the pad.

In use, the integral spindle 24' is inserted into aperture 14' from beneath base 12', rather than through the top. This enables diametrically opposed ears 54 and 56 on the lower circumference of spindle 24' to enter mating diametrically opposed, longitudinally extending slots 58 and 60 formed on a skirt or tube 62 extending downwardly from the circumference of aperture 14', which precludes rotation of the spindle 24' and pad 16' during compression, preventing torsion and wear and tear on the pad 16'.

What is claimed is:

1. A labeler for the placement of self-adhesive labels onto a compact disk or the like comprising:

a one-piece positioning spindle having a first and second portion, the second portion having a cross-sectional area smaller than the first portion for insertion in a spindle hole of a disk, a shoulder between the first and second portions for supporting a disk, a positioning base having a label supporting surface and a positioning hole, the first portion of the spindle including a resilient, compressible member being received within the positioning hole of the positioning base to permit movement of the shoulder and a disk supported thereon towards the label supporting surface on the positioning base for adhesion to the label upon contact therewith and to return the shoulder and disk to its initial position, and a plate integrally connected to the bottom of the resilient, compressible member to stabilize and rigidify the same during compression;

wherein the components of the labeler can be disassembled for storage and shipment.

2. The labeler of claim 1, wherein the first and the second spindle portions are cylindrical in shape.

3. The labeler of claim 2, wherein the positioning hole is circular in shape and the resilient, compressible member is cylindrical in shape.

4. The labeler of claim 1, wherein the resilient, compressible member further comprises a foam pad that is ultrasonically welded to the bottom of the first portion of the spindle.

5. The labeler of claim 1, wherein the positioning base is circular in shape.

6. The labeler of claim 1, wherein the member is formed from rubber.

7. The labeler of claim 1, wherein the member is formed from neoprene.

8. The labeler of claim 1 further comprising a washer adapted to be positioned over and around the second portion of the spindle and on a disk seated on the shoulder to protect against contact with the disk.

9. The labeler of claim 8, wherein the washer includes a plurality of radial arms extending outwardly therefrom adapted for contact with a plurality of fingers adapted to exert a force on the disk against the compression of the member, to adhere the disk to the label on the positioning plate.

10. The labeler of claim 9 further comprising a plate on the bottom of the washer adapted to raise the washer above the plane of a disk seated on the shoulder to preclude scratching the surface thereof.

11. The labeler of claim 1 further comprising a tube extending downwardly from the positioning plate adjacent to the positioning hole to guide and house the first spindle portion to preclude lateral movement thereof, the tube being axially aligned with the positioning hole.

12. The labeler of claim 11, wherein the tube includes a pair of diametrically opposed slots opening in the bottom edge thereof, and wherein the spindle includes a pair of diametrically opposed ears received in the slots to preclude rotation of the spindle relative to the base.

* * * * *